United States Patent [19]

Schönfeld et al.

[11] Patent Number: 5,834,072
[45] Date of Patent: Nov. 10, 1998

[54] POWDER COATINGS WHOSE PERCEIVED COLOR DEPENDS ON THE VIEWING ANGLE

[75] Inventors: Axel Schönfeld, Wiesbaden; Erwin Dietz, Königstein, both of Germany

[73] Assignee: Clariant GmbH, Frankfurt, Germany

[21] Appl. No.: 825,634

[22] Filed: Apr. 1, 1997

[30] Foreign Application Priority Data

Apr. 1, 1996 [DE] Germany ................. 196 12 974.5

[51] Int. Cl.$^6$ .............................. B05D 5/06; C09K 19/02
[52] U.S. Cl. .................................... 428/1; 252/299.01
[58] Field of Search ............................ 428/1; 252/299.01

[56] References Cited

FOREIGN PATENT DOCUMENTS 4408170  9/1995  Germany.

*Primary Examiner*—Erma Cameron
*Attorney, Agent, or Firm*—Connolly & Hutz

[57] ABSTRACT

An effect powder coating having a perceived color which is dependent on the viewing angle, consisting essentially of one or more noncurable cholesteric liquid-crystalline polymers, or essentially of at least one noncurable nematic liquid-crystalline polymer and at least one noncurable cholesteric liquid-crystalline polymer.

15 Claims, No Drawings

POWDER COATINGS WHOSE PERCEIVED COLOR DEPENDS ON THE VIEWING ANGLE

The invention relates to powder coatings having a bright perceived color which is dependent on the viewing angle, referred to below as effect powder coating, to processes for their preparation and to their use.

Numerous producers of pigments and coating materials are endeavoring on environmental grounds to replace aqueous paints and coating compositions, and especially those containing solvent, by solvent-free paints and coatings. This has been achieved in particular for unpigmented systems or for systems containing inorganic and/or organic absorption pigments. Replacing the solvent in effect basecoats would be particularly significant, since in order to orient the usually platelet-shaped special-effect pigments these coating materials in the course of processing, as a result of the system, are formulated for low viscosity and therefore have a particularly high solvent content. In connection with the production of effect basecoats, attempts have so far failed to produce solvent-free coatings which meet the performance requirements. Of particular interest in this context are effect coating materials whose coloredness depends on the viewing angle, comprising platelet-shaped cholesteric liquid-crystal pigments as optically active components, as are described, for example, in the following documents: W095129961, CA-A-2,186,954, CA-A-2,190,879, CA-A-2,191,251, CA-A-2, 148,573 and U.S. Pat. No. 5,362,315. These applications describe processes in the first step of which platelet-shaped particles are prepared which in the second step are dispersed in aqueous and/or solvent-containing coating systems. In the third step, known processing technologies are used to produce an effect coating therefrom.

DE 44 16 993 A1 describes effect coatings in which the pigment can be applied without binders. However, according to the information in this document, this is possible only with curable liquid-crystalline polymers using high-boiling solvents.

The polymer described in DE-A44 16 993 is based on 4-hydroxyphenyl 3-hydroxy-2-methylpropyl sulfide as chiral component, whose preparation requires a laborious synthesis. The liquid-crystal polymers are soluble in solvents, with the result that, here too, swelling problems occur with a clearcoat, leading likewise to an alteration of the pitch and thus to a change in the color properties. In addition, the compounds involved here are not pigments as normally understood by the skilled worker, since they are soluble in numerous solvents. Moreover, the precise establishment of color is difficult with these systems, since it takes place only on the coated surface of the article, and even small differences in temperature lead to marked differences in shade.

The object of the present invention was to develop effect coating systems, and especially effect basecoats, whose processing is simple and requires little or no solvents.

It has been found that powder effect coatings having a perceived color which is dependent on the viewing angle can, surprisingly, consist essentially of one or more cholesteric liquid-crystalline polymers which are not curable.

The present invention provides a powder effect coating having a perceived color which is dependent on the viewing angle, consisting essentially of at least one noncurable cholesteric liquid-crystalline polymers, or essentially of at least one noncurable nematic liquid-crystalline polymer and at least one noncurable cholesteric liquid-crystalline polymer.

The term noncurable is understood as meaning that the polymers concerned are unable to enter, with themselves or with other reactants, into any crosslinking reactions as may take place, for example, as a result of light-induced crosslinking in the case of the cinnamic acid derivatives used in DE-A-44 16 993.

The present invention relates in particular to powder effect coatings and to processes for their preparation where the effect coat is prepared using no solvents and, in addition, none of the binders that are otherwise customary.

The term effect in the present invention is understood as meaning not only the selective reflections in the visible region that are dependent on the viewing angle, but also selective reflections in the UV and IR regions. The latter selective reflections are not perceptible with the human eye but can easily be determined with the aid of UV and IR spectrometers.

The novel powder effect coatings comprise cholesteric liquid-crystalline polymers (cLCPs) which possess a helical superstructure. One consequence of this superstructure is that the material no longer has the anisotropy of the mechanical properties that is customary in the case of nematic liquid-crystal polymers. Another is that the material shows pronounced color effects. These effects are based on the selective reflection of the incident light by the helical superstructure. In this context, the exact reflection color depends on the viewing angle and, in particular, on the pitch of the helix. For any given viewing angle—for example a perpendicular view from above onto a sample—a reflection color appears, which is a color whose wavelength corresponds to the pitch of the helical superstructure. This means that the wavelength of the reflected light is shorter the shorter the pitch of the helix. The helical pitch which develops depends essentially on the proportion of chiral comonomer in the overall composition, on the nature of incorporation into the polymer, on the degree of polymerization and on the structure of the chiral comonomer (helical twisting power). Moreover, many systems still exhibit a more or less pronounced temperature-dependency of the pitch in the cholesteric phase, and thus a variation in the color properties as well. It is readily possible, for example, by varying the proportion of the chiral comonomer, to produce a polymer having a blue, green or gold color effect.

Polymers which can be used as cLCPs in accordance with the invention are all cholesteric liquid-crystalline main-chain polymers and also cholesteric liquid-crystalline side-group polymers or combined main-chain/side-group polymers.

Examples of cholesteric side-group polymers are polysiloxanes, cyclic siloxanes, polyacrylates or polymethacrylates, in noncurable form, having mesogens in the side groups. The mesogens in the side group may include all the structures known to the skilled worker, such as cholesterol-substituted phenylbenzoates or biphenols, for example.

Cholesteric main-chain polymers are generally prepared from a chiral component and from hydroxycarboxylic acids and/or a combination of dicarboxylic acids and diols. In general, the polymers consist essentially of aromatic constituents. However, it is also possible to employ aliphatic and cycloaliphatic components, for example cyclohexanedicarboxylic acid.

In the context of the present invention, preference is given to cholesteric liquid-crystalline main-chain polymers consisting essentially of a) from 0 to 99.9 mol % of at least one compound from the group consisting of aromatic hydroxycarboxylic acids, cycloaliphatic hydroxycarboxylic acids and aromatic aminocarboxylic acids;
b) from 0 to 49.5 mol % of at least one compound from the group consisting of aromatic dicarboxylic acids and cycloaliphatic dicarboxylic acids;
c) from 0 to 49.5 mol % of at least one compound from the group consisting of aromatic diols, cycloaliphatic diols and aromatic diamines;
d) from 1 to 40 mol %, preferably from 2 to 25 mol %, of chiral, bifunctional comonomers;
e) from 0 to 5 mol % of a branchable component having more than two functional groups, the sum adding up to 100 mol %.

In the case of the percentages indicated care should be taken that the stoichiometry of the functional groups for the polycondensation, which is familiar to the skilled worker, is ensured.

In addition, the polymers may also include components having more than two functional groups, for example dihydroxybenzoic acids, trihydroxybenzenes or trimellitic acid. These components act as a branching site in the polymer and should be added only in low concentrations, for example from 0 to 5 mol %, in order to avoid crosslinking of the material.

Particular preference is given to cholesteric main-group polymers which are composed of the following units of the individual monomer groups:

a) Aromatic hydroxycarboxylic acids, aminocarboxylic acids:

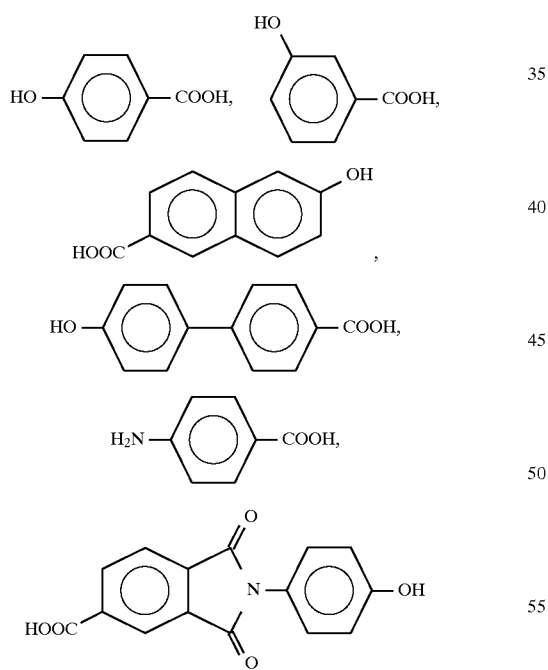

b) Aromatic dicarboxylic acids, aliphatic dicarboxylic acids:

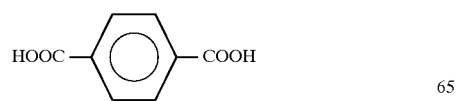

-continued

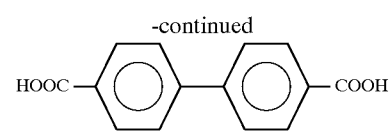

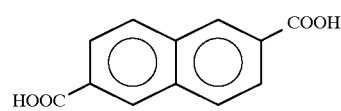

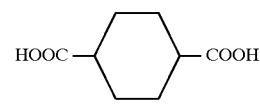

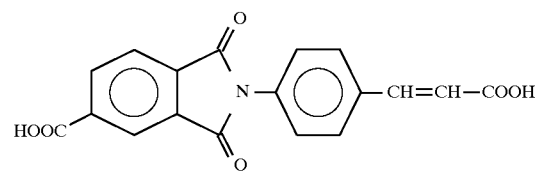

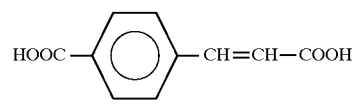

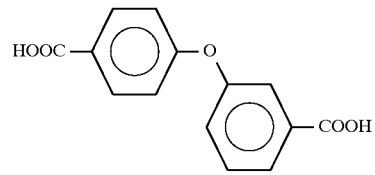

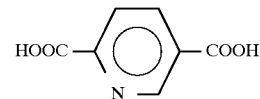

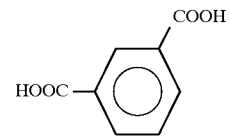

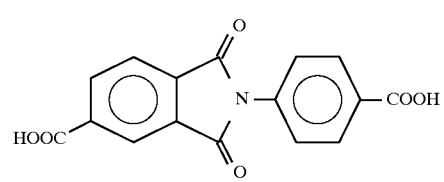

c) Aromatic diols, aminophenols, aromatic diamines:

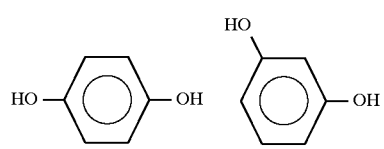

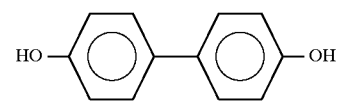

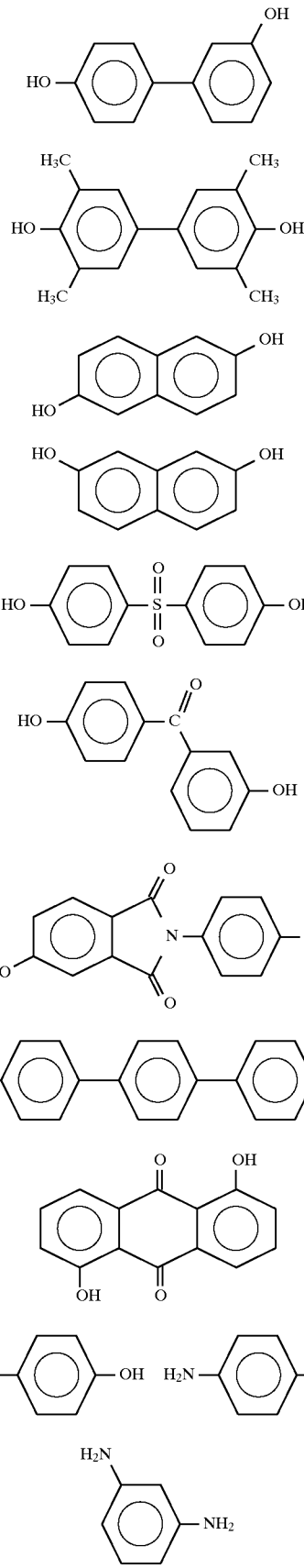

d) Chiral, bifunctional monomers:

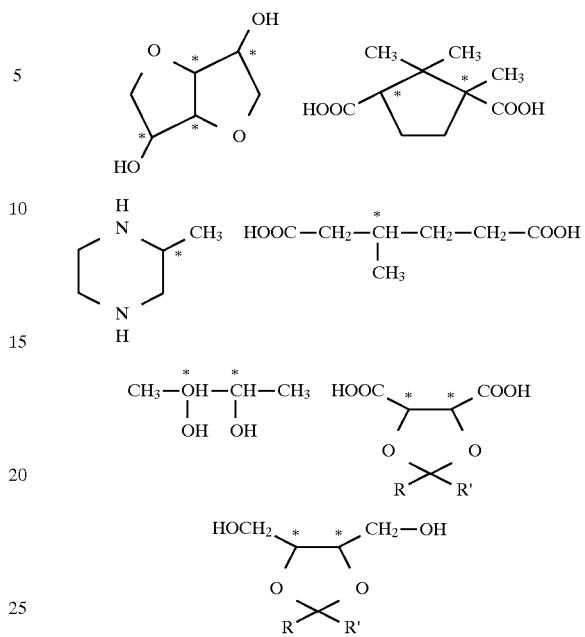

in which R and R', each independently, are H, $C_1$–$C_6$-alkyl or phenyl, preferably H or $CH_3$.

Particularly preferred cLCPs are polymers comprising camphoric acid and/or isosorbide as chiral component and also p-hydroxybenzoic acid and/or 2-hydroxy6-naphthoic and/or terephthalic acid and/or isophthalic acid and/or hydroquinone and/or resorcinol and/or 4,4'-dihydroxybiphenyl and/or 2,6-naphthalenedicarboxylic acid.

The chiral comonomers are preferably employed in an enantiomerically pure form. Where enantiomer mixtures of a comonomer are used, care should be taken to ensure that one enantiomeric form is present in an effective excess.

The monomers employed in accordance with the invention can be used directly or else appropriate precursors can be used, which react under the subsequent reaction conditions to form the desired monomers. For example, aminophenol and trimellitic anhydride can be employed instead of N-(4-hydroxyphenyl)trimellitimide.

Polycondensation can be carried out by way of all of the polycondensation methods known to the skilled worker. A suitable example is the melt condensation with acetic anhydride which is described in U.S. Pat. No. 5,093,025.

The monomers are preferably linked by way of ester linkages (polyesters) and/or by way of amide linkages (polyester amide/polyamide), although linking can also take place via other types of linkage known to the skilled worker, for example polyester imide.

When selecting the monomer units, care should be taken to ensure that the functional groups are in stoichiometry, which is known to the skilled worker; in other words, that functional groups which react with one another in the polycondensation reaction are employed in appropriate proportions. For example, when using dicarboxylic acids and diols, the number of hydroxyl groups present must correspond to the number of carboxyl groups. In a further embodiment, however, it is possible—in order to vary the molecular weight—to employ monomers from groups b) to d) or the listed components having more than two functional groups in an excess that is required in order to achieve a defined molecular weight. In addition, the molecular weight can be influenced by the use of monofunctional monomers.

Instead of the carboxylic acids it is also possible to employ other carboxylic acid derivatives known to the skilled worker, examples being acid chlorides or carboxylic esters. Instead of the hydroxy components, it is also possible to employ corresponding hydroxy derivatives, for example the acetylated hydroxy compounds.

The polymer units described may also contain further substituents, for example methyl, methoxy or halogen.

It is also possible to prepare cholesteric liquid-crystalline polymers by mixing colorless and/or colored nematic and/or cholesteric liquid-crystalline polymers. In that case the shade of the powder effect coating can be varied within wide limits and adjusted with precision.

Particularly suitable nematic liquid-crystalline polymers are those comprising p-hydroxybenzoic acid and/or 2-hydroxy6-naphthoic acid; 2,6-naphthalenedicarboxylic acid, terephthalic acid and/or isophthalic acid; hydroquinone, resorcinol and/or 4,4'-dihydroxybiphenyl.

Where main-chain polymers are used the cLCPs possess, in one preferred embodiment, a very low solubility, with the result that their molecular weights cannot be determined by customary methods (GPC, light scattering). As a measure of the molecular weight it is possible to use the intrinsic viscosity of the polymers in a solution of pentafluorophenol/ hexafluoroisopropanol. Suitable polymers are those having an intrinsic viscosity of between 0.1 dl/g and 10 dl/g.

The preferred main-chain polymers possess high thermal stability and, as a result of their low solubility, an outstanding stability with respect to the solvents used in coating materials. As a consequence, they render superfluous crosslinking reactions after application to the substrate surface. As a result of this not only the application but also the synthesis is much simpler.

The invention also provides a process for preparing a powder effect coating having a perceived color which is dependent on the viewing angle, which comprises converting the noncurable, cholesteric liquid-crystalline polymers and, if desired, the noncurable nematic liquid-crystalline polymers into a finely divided powder, directly in the course of their synthesis or in a subsequent process, applying this powder to the object that is to be coated, using a powder coating technique, and converting the applied powder by temperature treatment into a film whose perceived color is dependent on the viewing angle.

Where the cLCPs and, where used, LCPs are not obtained in the form of a finely divided powder directly from the synthesis, they must be converted into such a powder after synthesis. Where synthesis is conducted as a melt condensation, then an appropriate first comminution step after the synthesis is extrusion as a strand or strip. The resulting strands or strips can be converted in a known manner, using choppers or granulators, into chips or granules. However, the polymers can also be isolated in other ways and subsequently subjected to coarse comminution by means of cutting and sawing processes.

Further comminution can be appropriately effected using milling equipment of all types and designs. In this context, the ultimate fineness required can be achieved in one process step or else in a number of substeps in identical or different types of mill. If the milling process conducted does not lead directly to the desired minimum fineness and particle-size distribution, then it is appropriate to subject the milled material, during or after the milling process, to sieving or classification procedures in order to guarantee the desired minimum fineness and to obtain a desired, optimum particle-size fraction. Examples of suitable milling apparatus are mills of the vibrating, vibrating-disk, disk, planetary, centrifugal, mortar, ball, cross beater, rotor beater, cutting, hammer, blade, rotor-stator, impact-plate and, in particular, ultracentrifugal, universal, pin and air-jet types. In specific cases, it is also possible to carry out wet milling in ballmills, sandmills, vibrating mills or beadmills.

Milling of the cLPCs and, where used, LCPs can be omitted if they are prepared by polymerization in an emulsified or dispersed phase to give a very finely divided powder.

The novel powder effect coatings can be applied by the following preferred methods:

The polymer powder obtained from the synthesis of the polymer or following a milling procedure is electrostatically charged in the actual spraying process. In the case of the corona process, this is effected by guiding the powder past a charged corona. In this case, the powder itself becomes charged. In the case of the triboelectric or electrokinetic process, the principle of triboelectricity—frictional electricity—is employed. Within the spraying device, the powder acquires an electrostatic charge counter to the charge of the friction partner, generally a hose or a spraying pipe (made of polytetrafluoroethylene, for example). The electrostatic charging leads to a high degree of deposition of the powder on the article that is to be coated. Following application to the article, the powder coat is heated to temperatures above the softening point of the powder, at which the polymers form a homogeneous film and the helical superstructures are formed. The temperature at which formation of the helical structure begins is referred to below as chiralization temperature.

The specific optical properties of the novel powder effect coatings are not observed until the molecules, above the chiralization temperature of the polymer, form the helical structure. Transition to the cholesteric phase takes place in many cases as early as during the synthesis of the polymers. The wavelength of selective reflection of the cLCPs employed in accordance with the invention is determined by the pitch of the helical structure. The pitch is dependent on the structure of the polymer, on the melt viscosity, on the presence of solvents and, in particular, on the helical twisting power of the chiral monomer. In addition, it is a function of the temperature. Accordingly, the pitch of the helix can also be adjusted by way of the temperature. By cooling the coated substrates rapidly, the pitch of the helix, and thus the selective reflection, can be "frozen in" permanently. In the case of slow cooling, changes in color properties must be expected. In general, colored substrates are obtained in this way too. However, it is difficult to determine the final color properties beforehand. If the cooled substrate is heated again, then it is possible to establish new helical pitches, or the same pitches again, and thus to adjust the wavelength of selective reflection. Through this operation the color properties of the coated substrate can be corrected and varied in a simple manner. For practical application it is important that the melting point and the chiralization temperature of the polymer lie above the service temperature of the coated substrate.

In addition to temperature and the action of shear forces, the formation of the helical structure can be promoted by means of substrates having polymeric coats, for example polyvinyl alcohol, cellulose derivatives and polyimides. Depending on the structure of the polymers, the orientation of the polymer molecules can also be positively influenced by means of electrical and magnetic fields.

A further, preferred possibility for coating articles with pulverulent substances is by flame spraying. In this process the powder is fluidized with a carrier gas (for example in a fluidized bed) and supplied to the central nozzle of a flame spraygun. At the same time, in the flame spraygun, a fuel-gas/oxygen mixture is produced which is burnt in numerous small flamelets arranged in an annular configuration around the center. The pulverulent particles then melt and are subsequently deposited on the coating substrate as droplets which, in the course of the spraying process, coalesce to form a film. This technique offers the particular advantage that the melting operation is integrated with the spraying process, so that application of the coating to the article, and film formation, can be done in one operation.

Another preferred embodiment for powder coating is the fluidized-bed sintering technique. For this technique, a fluidized bed is generated in an appropriate container with the aid of a carrier gas and the novel polymer powder. The article to be coated is heated, in a separate thermal chamber, to the temperature required for coating, and after reaching this temperature it is immersed for a certain period in the fluidized bed. In the course of this immersion, pulverulent particles remain adhering to the surface of the article, then melt, coalesce to form a film, and develop the helical structure. In some cases it is advantageous to subject the coated article to an additional thermal treatment in order to improve film formation and the orientation of the polymer molecules. In other cases the object can be cooled in air or quenched with water. This technique too, offers the particular advantage that the melting operation is integrated with the coating process so that application of the coating to the article, orientation of the polymer molecules and film formation can be done in one operation.

In all of the powder coating techniques described, and especially with the fluidized-bed sintering and flame spraying technique, the particle morphology, and thus the flowability of the powder, and also the particle-size distribution of the powder, are of great importance. Preference is given to particles that are as close as possible to spherical and have a narrow size distribution. Spherical particles are obtained readily in processes where polymerization is conducted in an emulsified or dispersed phase. The milling processes lead—depending on the type of milling employed—to narrower or broader particle-size distributions. In some cases it is advantageous to follow milling by a sieving, classification or screening process in order to obtain a particle-size distribution that is as narrow as possible. In other cases it is advantageous first of all to prepare a very finely divided powder which can subsequently be subjected to controlled agglomeration to give the desired particle size.

The desired particle size is critical for the coat thickness of the effect powder coating, the nature of the article to be coated and the application technique employed. If thin coats are desired on the object that is to be coated, then the target mean particle size of the powder is between 1 and 100 $\mu$m, preferably between 15 and 80 $\mu$m. Where thick coats are desired on the article, as are normally applied in fluidized-bed sintering and flame spraying, then a mean particle size of between 80 and 300 $\mu$m, preferably from 100 to 250 $\mu$m, is advantageous. In the case of fluidized-bed sintering and flame spraying it is particularly important to observe the limits on particle size. Excessively small particles are heated too strongly by the high flame temperatures, and become carbonized or are blown away by the flow of gas. Excessively coarse particles, on the other hand, are not melted completely and are unable to undergo optimum orientation in the course of subsequent film formation. In exceptional cases, however, it may also be advantageous to use a particle-size distribution which lies outside this range.

The novel effect powder coatings can be applied to a wide variety of substrates. These substrates may, for example, be articles made from natural and synthetic materials such as, for example, wood, plastics, metal or glass. If the effect coating is applied without a prior coating, then it is advisable to apply it in a coat thickness which masks the substrate. It is of course also possible to apply a plurality of coats or to produce semitransparent coatings. Particular preference is given to coating the bodywork, or bodywork parts, of motor vehicles.

In preferred cases, the effect powder coating is applied to metal or plastics substrates. These have in most cases been coated beforehand. In other words, plastics substrates can be provided with a plastics primer, and metallic substrates generally have an electrophoretically applied primer and, if desired, one or more further coats, for example a filler coat.

Dark substrates are particularly preferred. The term substrate in this context refers not only to a substrate whose surface is given a dark coat but also an inherently dark-colored substrate, for example a plastics substrate or a metal substrate which has been coated with a dark oxide layer. Examples of dark coats are electrophoretically applied, spray-applied or powder-coated primers, plastics primers, filler coats and antistonechip coats, and solid-color basecoats and topcoats. Examples of dark substrate backgrounds are dark red, dark blue, dark green, dark brown, dark gray and, in particular, black. The novel powder coatings can also be applied to light-colored backgrounds or in hiding coats. In that case, however, the viewing-angle-dependent perceived color is expressed only to a weakened extent.

The novel effect powder coatings can be coated with a clearcoat by customary methods. Suitable clearcoats are in principle all known clearcoats or transparent-pigmented coating compositions. In this context it is possible to employ both solvent-containing one-component or two-component coating materials and, preferably, water-dilutable clearcoats and, in particular, powder coatings. In some cases it may be expedient to use a somewhat thicker clearcoat or to apply 2 clearcoats of identical or different liquid clearcoats or transparent powder coatings. As is known, the clearcoat contains further auxiliaries which improve the surface properties of the coated articles. Examples that may be mentioned are UV stabilizers and light stabilizers, which protect the underlying layers against degradation reactions.

Prior to or during application, the novel effect powder coatings may have added to them further substances as are customary in the case of plastics processing, painting and coating techniques. Examples that may be mentioned are polymers other than liquid-crystalline polymers, charge control agents, absorption and interference pigments, fillers, adhesion promoters, light stabilizers, other stabilizers, and substances which influence rheology and leveling.

The novel effect powder coatings can be produced with a few, simple process steps, in high yield, and without the production of nonreutilizable waste, and can be applied by all prior-art techniques for powder coating without the use of solvents or otherwise customary binders. In addition to ease of processing, they are notable for high temperature stability, solvent resistance and chemical resistance, and very bright shades with a pronounced dependency of the perceived color on the viewing angle.

In the examples which follow, parts are by weight.

EXAMPLE A1

Synthesis of a cLCP 2821 parts of 2-hydroxy-6-naphthoic acid, 6215 parts of 4-hydroxybenzoic acid, 3724 parts of 4,4'- dihydroxybiphenyl and 3203 parts of (R)-(+)-3-methyladipic acid are charged to a reactor, 10,460 parts of acetic anhydride are added, and a gentle stream of nitrogen is flushed through. The mixture is heated to 140° C. over the course of 15 minutes, and this temperature is maintained for 20 minutes. The temperature is then raised to 320° C. over the course of 150 minutes, and the melt is held at this temperature for 15 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, cooled and isolated. When viewed straight on the polymer has a bright golden color, which at an oblique viewing angle appears greenish.

EXAMPLE A2

Synthesis of a cLCP 14,110 parts of 2-hydroxy-6-naphthoic acid, 31,077 parts of 4-hydroxybenzoic acid, 18,621 parts of 4,4'-dihydroxybiphenyl and 3203 parts of (1R,3S)-(+)-camphoric acid are charged to a reactor, 52,580 parts of acetic anhydride are added, and a gentle stream of nitrogen is flushed through. The mixture is heated to 140° C. over the course of 15 minutes, and this temperature is maintained for 20 minutes. The temperature is then raised to 330° C. over the course of 150 minutes, and the melt is held at this temperature for 15 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, cooled and isolated. When viewed straight on the polymer has a bright golden color, which at an oblique viewing angle appears blue-green.

EXAMPLE A3

Synthesis of a cLCP 28,218 parts of 2-hydroxy-6-naphthoic acid, 34,530 parts of 4-hydroxybenzoic acid, 8307 parts of terephthalic acid, 3491 parts of 4,4'-dihydroxybiphenyl and 4567 parts of 1,4:3,6-dianhydro-D-sorbitol (isosorbide) are charged to a reactor, 52,326 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer melts at 180° C. and has a bluish green color when viewed straight on. The color develops in the course of condensation under reduced pressure and is retained after cooling.

EXAMPLE A4

Synthesis of a cLCP 28,218 parts of 2-hydroxy-6-naphthoic acid, 34,530 parts of 4-hydroxybenzoic acid, 8307 parts of terephthalic acid, 3724 parts of 4,4'-dihydroxybiphenyl and 4384 parts of 1,4:3,6-dianhydro-D-sorbitol (isosorbide) are charged to a reactor, 52,686 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer melts at 168° C. and has a reddish blue color when viewed straight on. The color develops in the course of condensation under reduced pressure and is retained after cooling.

EXAMPLE A5

Synthesis of a cLCP 22,582 parts of 2-hydroxy-6-naphthoic acid, 49,723 parts of 4-hydroxybenzoic acid, 9968 parts of terephthalic acid, 8,714 parts of 1,4:3,6-dianhydro-D-sorbitol (isosorbide) are charged to a reactor, 63,283 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer has a dark violet color with a dirty effect. The color develops during condensation under reduced pressure.

EXAMPLE A6

Synthesis of a cLCP 45,163 parts of 2-hydroxy-6-naphthoic acid, 38,121 parts of 4-hydroxybenzoic acid, 6977 parts of terephthalic acid, 6,138 parts of 1,4:3,6-dianhydro-D-sorbitol (isosorbide) are charged to a reactor, 63,283 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer has a beige color with a slight glimmer. The color develops during condensation under reduced pressure and is retained after cooling.

EXAMPLE A7

Synthesis of a cLCP 28,218 parts of 2-hydroxy-6-naphthoic acid, 34,530 parts of 4-hydroxybenzoic acid, 8307 parts of terephthalic acid, 2793 parts of 4,4'-dihydroxybiphenyl and 5115 parts of 1,4:3,6-dianhydro-D-sorbitol (isosorbide) are charged to a reactor, 52,326 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer melts at 148° C. and has a red-gold color when viewed straight on. The color develops in the course of condensation under reduced pressure and is retained after cooling.

EXAMPLE A8

Synthesis of a cLCP 28,218 parts of 2-hydroxy-6-naphthoic acid, 34,530 parts of 4-hydroxybenzoic acid, 8307 parts of terephthalic acid, 2327 parts of 4,4'-dihydroxybiphenyl and 5480 parts of 1,4:3,6-dianhydro-D-sorbitol (isosorbide) are charged to a reactor, 52,326 parts of acetic anhydride are added, and a gentle stream of nitrogen is flushed through. The mixture is heated to 140° C. over the course of 15 minutes, and this temperature is maintained for 30 minutes. The temperature is then raised to 335° C. over the course of 165 minutes, and the melt is stirred further at this temperature for 30 minutes. From about 220° C., acetic acid begins to distill off. The nitrogen flushing is then terminated and reduced pressure is applied. The melt is stirred for a further 30 minutes under reduced pressure (about 5 mbar). The polymer is then subjected to nitrogen, discharged through an extruder and pelletized.

The polymer melts at 158° C. and has a green-gold color when viewed straight on. The color develops in the course of condensation under reduced pressure and is retained after cooling.

EXAMPLE B1

Preparation of a cLCP Powder

The pelletized polymer prepared in Example A4 is pre-ground on a cutting mill to a particle size <2 mm. Final milling takes place on a high-performance ultracentrifugal mill with a 0.2 mm sieve separator. This produces a powder having a mean particle size $D_{50}$ of 69 µm.

EXAMPLE B2

Preparation of a cLCP Powder

The polymer prepared in Example A3 is preground on a cutting mill to a particle size <2 mm. Final milling takes place on an air-jet mill with metering unit. This produces a powder having a mean particle size $D_{50}$ of 31 µm.

EXAMPLE B3

Preparation of a cLCP Powder

The pelletized polymer prepared in Example A4 is pre-ground on a cutting mill to a particle size <2 mm. Final milling takes place with increased throughput on a high-performance ultracentrifugal mill with a 0.2 mm sieve separator. This produces a powder having a mean particle size $D_{50}$ of 117 µm.

EXAMPLE B4

Preparation of a cLCP Powder with Narrow Particle-size Fraction

A vibrating sieve is used to separate off all particles larger than 150 µm and smaller than 90 µm from the powder prepared in Example B3, to give a powder having a particle-size fraction of between 90 and 150 µm.

EXAMPLE B5

Preparation of an LCP Blend 2000 parts of the cLCP prepared in Example A5 are ground on a cutting mill to a particle size <2 mm and are mixed with 1000 parts of the cLCP prepared in Example A6 that has been ground in the same way. The mixture is subsequently extruded in a single-screw extruder at temperatures between 250° C. and 320° C. to give a strand which is cooled with air and granulated. A blend is obtained which when viewed straight on has a bright blue color.

EXAMPLE B6

Preparation of a cLCP Blend

Example B5 is repeated with a mixture of 15 parts of the cLCP prepared in Example A5 and 15 parts of the cLCP prepared in Example A6. A blend is obtained which when viewed straight on has a bright green-blue color.

EXAMPLE B7

Preparation of a cLCP Powder

The extruded granules prepared in Example B5 are ground on a universal mill with blade insert to a particle size <2 mm. Final milling takes place with medium throughput on a high-performance ultracentrifugal mill with a 0.2 mm sieve separator. This produces a powder having a particle size of <200 µm.

EXAMPLE B8

Preparation of a cLCP Powder

The extruded granules prepared in Example B6 are ground on a universal mill with blade insert to a particle size <2 mm. Final milling takes place with medium throughput on a high-performance ultracentrifugal mill with a 0.2 mm sieve separator. This produces a powder having a particle size of <200 µm.

EXAMPLE B9

Preparation of a cLCP Powder

The polymer prepared in Example A1 is precomminuted to centimeter-sized pieces and is ground on a universal mill with blade insert to a particle size <1 mm. Final milling takes place with medium throughput on a high-performance ultra-centrifugal mill with a 0.2 mm sieve separator. This produces a powder having a particle size of <200 µm.

EXAMPLE B10

Preparation of a cLCP Powder

The polymer prepared in Example A2 is precomminuted to centimeter-sized pieces and is ground on a universal mill with blade insert to a particle size <2 mm. Final milling takes place with medium throughput on a high-performance ultracentrifugal mill with a 0.2 mm sieve separator. This produces a powder having a particle size of <200 µm.

EXAMPLE B11

Preparation of a cLCP Powder

The polymer prepared in Example A3 is ground on a cutting mill to a particle size <2 mm. Final milling takes place on an air-jet mill with metering unit and at high throughput. This produces a powder having a mean particle size $D_{50}$ of 322 µm.

EXAMPLE B12

Preparation of a cLCP Powder with Narrow Particle-size Fraction

A vibrating sieve is used to separate off all particles larger than 150 µm and smaller than 90 µm from the powder prepared in Example B11, to give a powder having a particle-size fraction of between 90 and 150 µm.

EXAMPLE B13

Preparation of a cLCP Masterbatch 1470 parts of the cLCP prepared in Example A7 are ground on a cutting mill to a particle size <1 mm and are mixed with 30 parts of C.I. Pigment Red 149. The mixture is subsequently extruded on a single-screw extruder at temperatures of between 240° C. and 290° C. to give a strip which is cooled with air and granulated. Granules are obtained which when viewed straight on have a strong red-gold color.

EXAMPLE B14

Preparation of a cLCP Masterbatch 1470 parts of the cLCP prepared in Example A8 are ground on a cutting mill to a particle size <1 mm and are mixed with 30 parts of C.I. Pigment Black 7. The mixture is subsequently extruded on a single-screw extruder at temperatures of between 240° C. and 290° C. to give a strip which is cooled with air and granulated. Granules are obtained which when viewed straight on have a strong green-gold color.

EXAMPLE B15

Preparation of a cLCP Powder

The granules prepared in Example B13 are precomminuted on a cutting mill and ground with a universal mill with blade insert to a particle size <1 mm. Final milling takes place at medium throughput on a high-performance ultracentrifugal mill with a 0.2 mm sieve separator. This gives a powder having a particle size <200 µm.

EXAMPLE B16

Preparation of a cLCP Powder

The granules prepared in Example B14 are precomminuted on a cutting mill and ground with a universal mill with blade insert to a particle size <1 mm. Final milling takes place at medium throughput on a high-performance ultracentrifugal mill with a 0.2 mm sieve separator. This gives a powder having a particle size <200 µm.

EXAMPLE C1

Preparation of an Effect Powder Coating Using a Triboelectric Spraygun

The powder prepared in Example B2 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film is obtained which when viewed straight on has a bright green-blue color and when viewed at an oblique angle has a bright reddish blue color.

EXAMPLE C2

Preparation of an Effect Powder Coating Using a Corona Spraygun

The powder prepared in Example B1 is placed in the powder container of a corona spraygun from Intec, Dortmund. A voltage of 35 kV is applied to the electrodes of the spraygun. This spraying device is used to coat an aluminum panel, which is primed with a black powder coating, by crosswise application in a spray booth from Werner & Pfleiderer, Stuttgart, at medium powder throughput. For film formation, the coated panel is heated at 275° C. for 5 minutes and then dipped in water. A homogeneous film is obtained which when viewed straight on has a bright green-blue color and when viewed at an oblique angle has a bright reddish blue color.

EXAMPLE C3

Preparation of an Effect Powder Coating Using a Flame Spraygun

Some of the powder prepared in Example B12 is placed in the powder container of the flame spraygun ®Unisprayjet SIJ, fitted with nozzle LTA, from UTP, Bad Krotzingen. The gun is operated at an acetylene pressure of 0.6 bar and an oxygen pressure of 2.5 bar. The powder is sprayed onto a 3 mm thick, sand-blasted steel panel which has been preheated at 280 to 300° C. 60 seconds after the end of application, the panel is dipped into a water bath. A homogeneous, blue-green coating with a thickness of about 250 µm is obtained which when viewed at an oblique angle has a red-blue color. If the panel is cooled in air, a film is obtained which when viewed straight on has a green-gold color and when viewed at an oblique angle has a blue-green color.

EXAMPLE C4

Preparation of an Effect Powder Coating by the Fluidized-bed Sintering Process

Some of the powder prepared in Example B4 is placed in a fluidized-bed chamber and is fluidized with dry air. A 3 mm thick steel panel which has been heated beforehand to 320° C. is immersed in this fluidized bed for 2 seconds. A powder coat is immediately deposited on the surface of the panel; the coat begins to melt and a blue-green film is formed. Quenching in water gives a film which when viewed straight on is blue-green and when viewed at an oblique angle has a red-blue shade.

EXAMPLE C5

Preparation of an Effect Powder Coating Using a Triboelectric Spraygun

The powder prepared in Example B9 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film with a thickness of about 25 μm is obtained which when viewed straight on has a bright reddish gold color and when viewed at an oblique angle has a bright yellow-green color.

EXAMPLE C6

Preparation of an Effect Powder Coating Using a Triboelectric Spraygun

The powder prepared in Example B10 is placed in the powder container of the spraying device "®Tribostar" from Intec, Dortmund. The spraying device is fitted with a standard spray pipe and a star-shaped internal rod. This spraying device is used to spray an aluminum panel, primed with a black alkyd/melamine resin stoving enamel, by crosswise application in a spray booth from Intec, Dortmund at a high powder throughput and at a spraying pressure of 3 bar. For film formation, the coated panel is heated at 200° C. for 5 minutes and then dipped in water. A homogeneous film with a thickness of about 25 μm is obtained which when viewed straight on has a bright reddish gold color and when viewed at an oblique angle has a bright bluish green color.

EXAMPLE C7

Preparation of an Effect Powder Coating Using a Triboelectric Spraygun

The powder prepared in Example B10 is placed in the powder container of the spraying device "®Tribostar" from Intec, Dortmund. The spraying device is fitted with a standard spray pipe and a star-shaped internal rod. This spraying device is used to spray an aluminum panel, primed with a red alkyd/melamine resin stoving enamel, by crosswise application in a spray booth from Intec, Dortmund at a high powder throughput and at a spraying pressure of 3 bar. For film formation, the coated panel is heated at 200° C. for 5 minutes and then dipped in water. A homogeneous film with a thickness of about 20 μm is obtained which when viewed straight on has a bright reddish gold color and when viewed at an oblique angle has a bright greenish gold color.

EXAMPLE C8

Preparation of an Effect Powder Coating Using a Triboelectric Spraygun

The powder prepared in Example B10 is placed in the powder container of the praying device "®Tribostar" from Intec, Dortmund. The spraying device is fitted with a standard spray pipe and a star-shaped internal rod. This spraying device is used to spray an aluminum panel, primed with a blue powder coating, by crosswise application in a spray booth from Intec, Dortmund at a high powder throughput and at a spraying pressure of 3 bar. For film formation, the coated panel is heated at 200° C. for 5 minutes and then dipped in water. A homogeneous film with a thickness of about 25 μm is obtained which when viewed straight on has a bright gold color and when viewed at an oblique angle has a bright greenish gold color.

EXAMPLE C9

Preparation of an Effect Powder Coating Using a Triboelectric Spraygun

The powder prepared in Example B7 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film with a thickness of about 25 μm is obtained which when viewed straight on has a bright blue color and when viewed at an oblique angle has a bright reddish blue color.

EXAMPLE C10

Preparation of an Effect Powder Coating Using a Triboelectric Spraygun

The powder prepared in Example B8 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film with a thickness of about 25 μm is obtained which when viewed straight on has a bright green-blue color and when viewed at an oblique angle has a bright reddish blue color. If the effect coating is coated with a customary commercial 2-component polyurethane clearcoat or with a water-dilutable clearcoat, then the brightness of the coating, the selective reflection and the color intensity are intensified.

EXAMPLE C11

Preparation of an Effect Powder Coating Using a Triboelectric Spraygun

The powder prepared in Example B2 is placed in the powder container of the spraying device "®Tribostar" from Intec, Dortmund. The spraying device is fitted with a standard spray pipe and a star-shaped internal rod. This spraying device is used to spray a dark red panel of ®Ceran glass from Schott, Mainz, by crosswise application in a spray booth from Intec, Dortmund at a high powder throughput and at a spraying pressure of 3 bar. For film formation, the glass panel is heated at 275° C. for 5 minutes and then dipped in water. A film is obtained which when viewed straight on has a bright green color and when viewed at an oblique angle has a bright blue color.

EXAMPLE C12

Preparation of an Effect Powder Coating Using a Triboelectric Spraygun

The powder prepared in Example B15 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film with a thickness of about 30 μm is obtained which when viewed straight on has a bright red-gold color and when viewed at an oblique angle has a bright greenish gold color with a reddish glimmer.

EXAMPLE C13

Preparation of an Effect Powder Coating Using a Triboelectric Spraygun

The powder prepared in Example B16 is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 275° C. for 5 minutes and then dipped in water. A homogeneous film with a thickness of about 20 μm is obtained which when viewed straight on has a greenish gold color and when viewed at an oblique angle has a bright blue-gold color.

EXAMPLE C14

Preparation of an Effect Powder Coating by the Fluidized-bed Sintering Process

Some of the powder prepared in Example B10 is placed in a fluidized-bed chamber and is fluidized with dry air. A wooden board which has been heated beforehand to 220° C. is dipped in this fluidized bed for 2 seconds. A coat is slowly deposited on the surface of the board; this coat begins to melt, and a golden film forms. After heating at 220° C. for 5 minutes a film is obtained which is red-gold when viewed straight on and when viewed at an oblique angle has a green-gold color.

EXAMPLE C15

Preparation of an Effect Powder Coating Using a Triboelectric Spraygun 1000 parts of the powder prepared in Example B1 are mixed thoroughly with 1000 parts of the powder prepared in Example B2 and the mixture is placed in the powder container of the spraying device "®Tribostar" from Intec, Dortmund. The spraying device is fitted with a standard spray pipe and a star-shaped internal rod. This spraying device is used to spray an aluminum panel, primed with a black powder coating, by crosswise application in a spray booth from Intec, Dortmund at a high powder throughput and at a spraying pressure of 3 bar. For film formation, the coated panel is heated at 270° C. for 5 minutes and then dipped in water. A homogeneous film with a thickness of about 20 μm is obtained which when viewed straight on has a greenish blue color and when viewed at an oblique angle has a bright reddish blue color.

We claim:

1. An effect powder coating having a perceived color which is dependent on the viewing angle, consisting essentially of at least one noncurable cholesteric liquid-crystalline polymer, or essentially of at least one noncurable nematic liquid-crystalline polymer and at least one noncurable cholesteric liquid-crystalline polymer.

2. An effect powder coating as claimed in claim 1, wherein the noncurable cholesteric liquid-crystalline polymer is a cholesteric liquid-crystalline side-group polymer, a cholesteric liquid-crystalline main-chain polymer or a combination thereof.

3. An effect powder coating as claimed in claim 2, wherein the cholesteric liquid-crystalline main-chain polymer consists essentially of liquid-crystalline polyester.

4. A powder coating composition comprising:

coatable, powder material having a mean particle size in the range of 1 to 300 μm which is essentially free of solvents and binders, said powder material comprising at least one coatable, polymerized, non-crosslinked, noncurable cholesteric liquid crystalline polymer powder which, when coated on a substrate and when the noncurable cholesteric liquid-crystal polymer is chiralized, has a perceived color which varies with the viewing angle; the intrinsic viscosity of the noncurable cholesteric liquid-crystalline polymer of said noncurable cholesteric, liquid-crystalline polymer powder, determined in pentafluorophneol/hexafluoroisopropanol solution, ranging from 0.1 dl/g to 10 dl/g.

5. A powder coating composition as claimed in claim 4, wherein said composition further comprises at least one noncurable nematic liquid-crystalline polymer.

6. A powder coating composition as claimed in claim 4, wherein the noncurable cholesteric liquid-crystal polymer of said noncurable cholesteric liquid-crystal polymer powder is the reaction product of the components consisting essentially of:

i) at least one compound having two ester-forming, amide-forming, or imide-forming groups or a combination of two said groups, ii) from 1 to 40 mol-%, based on the total of said components, of a chiral compound which is bifunctional with respect to component i), and iii) from 0 to 5 mol-%, based on the total of said components, of at least one compound having more than two ester-forming, amide-forming, or imide-forming groups or a combination of more than two of said groups.

7. An effect powder coating as claimed in claim 6, wherein the said component ii) is one or more compounds of the formulae

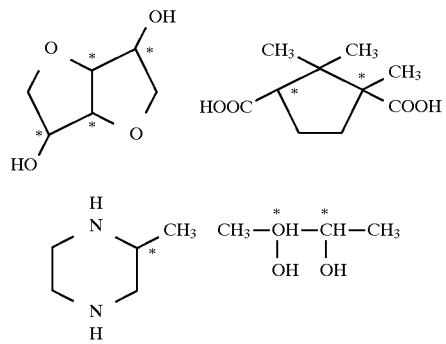

-continued $$HOOC-CH_2-\overset{*}{CH}-CH_2-CH_2-COOH$$
$$\underset{CH_3}{|}$$

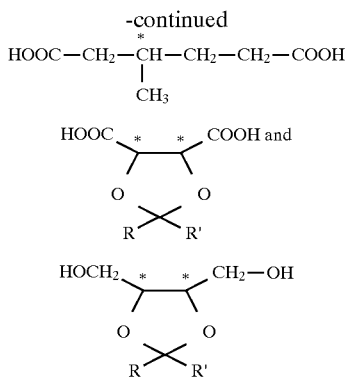

in which R and R', each independently of one another are H, $C_1$–$C_6$-alkyl or phenyl.

8. A powder coating composition as claimed in claim 6, wherein the amount of said component ii) ranges from 5 to 25 mol-%, based on the total of said components.

9. A powder coating composition as claimed in claim 6, wherein said chiral compound is a enantiomeric monomer or an enantiomeric monomer mixture containing an excess of one of the enantiomers of said mixture.

10. A powder coating composition as claimed in claim 9, wherein said chiral compound is a diol or a dicarboxylic compound.

11. A powder coating composition as claimed in claim 6, wherein the compounds of components i), ii), and iii) contain one or more methyl, methoxy, or halogen substitutents.

12. A powder coating composition as claimed in claim 6, wherein the noncurable cholesteric liquid-crystal polymer of said noncurable cholesteric liquid-crystal polymer powder has a helical structure having a pitch which depends in part upon the proportion of said component ii), and wherein said noncurable cholesteric liquid-crystal polymer produces reflected color effects, the reflected color having a wavelength related to said pitch of the helical structure.

13. A powder coating composition as claimed in claim 4, wherein said composition further comprises at least one additive which is not liquid-crystalline.

14. An effect powder coating as claimed in claim 2, wherein the cholesteric liquid-crystalline side-group polymer has side chains, said side chains containing mesogenic groups.

15. An effect powder coating as claimed in claim 14, wherein the cholesteric liquid-crystalline side-group polymer has a non-curable main chain which is a polysiloxane, a cyclic siloxane, a polyacrylate, a polymethacrylate or a combination thereof.

* * * * *